United States Patent
Kecskemeti

(10) Patent No.: US 7,860,106 B2
(45) Date of Patent: Dec. 28, 2010

(54) SYSTEM AND METHOD FOR ROUTING TABLE COMPUTATION AND ANALYSIS

(75) Inventor: Delia Kecskemeti, Kanata (CA)

(73) Assignee: Wind River Systems, Inc., Alameda, CA (US)

( * ) Notice: Subject to any disclaimer, the term of this patent is extended or adjusted under 35 U.S.C. 154(b) by 890 days.

(21) Appl. No.: 11/352,858

(22) Filed: Feb. 13, 2006

(65) Prior Publication Data

US 2007/0189284 A1  Aug. 16, 2007

(51) Int. Cl.
*H04L 12/28* (2006.01)
*H04L 12/56* (2006.01)

(52) U.S. Cl. ............ 370/395.31; 370/389; 370/395.32; 709/328; 709/329

(58) Field of Classification Search ........... 370/379, 370/395.31, 218, 238, 255, 351, 382, 389, 370/395.32, 400, 428; 709/238, 239, 242
See application file for complete search history.

(56) References Cited

U.S. PATENT DOCUMENTS

| | | | | |
|---|---|---|---|---|
| 5,361,256 | A * | 11/1994 | Doeringer et al. | 370/390 |
| 5,535,195 | A * | 7/1996 | Lee | 370/256 |
| 5,687,168 | A * | 11/1997 | Iwata | 370/255 |
| 6,018,524 | A * | 1/2000 | Turner et al. | 370/392 |
| 6,181,698 | B1 * | 1/2001 | Hariguchi | 370/392 |
| 6,252,856 | B1 * | 6/2001 | Zhang | 370/254 |
| 6,421,731 | B1 * | 7/2002 | Ciotti, Jr. et al. | 709/238 |
| 6,466,985 | B1 * | 10/2002 | Goyal et al. | 709/238 |
| 6,483,833 | B1 * | 11/2002 | Jagannath et al. | 370/392 |
| 6,606,325 | B1 * | 8/2003 | Cain | 370/410 |
| 6,801,496 | B1 * | 10/2004 | Saleh et al. | 370/221 |
| 6,804,230 | B1 * | 10/2004 | Jennings et al. | 370/388 |
| 6,917,983 | B1 * | 7/2005 | Li | 709/238 |
| 6,928,485 | B1 * | 8/2005 | Krishnamurthy et al. | 709/242 |
| 6,956,858 | B2 * | 10/2005 | Hariguchi et al. | 370/395.31 |
| 6,996,559 | B1 * | 2/2006 | Beshai | 707/6 |
| 7,031,288 | B2 * | 4/2006 | Ogier | 370/338 |
| 7,079,542 | B2 * | 7/2006 | Park et al. | 370/395.52 |
| 7,082,473 | B2 * | 7/2006 | Breitbart et al. | 709/241 |
| 7,085,241 | B1 * | 8/2006 | O'Neill et al. | 370/254 |
| 7,174,387 | B1 * | 2/2007 | Shand et al. | 709/238 |
| 7,230,949 | B2 * | 6/2007 | Bharali et al. | 370/395.2 |
| 7,308,495 | B2 * | 12/2007 | Ishiyama et al. | 709/223 |
| 7,346,009 | B2 * | 3/2008 | Brown et al. | 370/256 |
| 7,366,111 | B2 * | 4/2008 | Thubert et al. | 370/254 |
| 7,369,561 | B2 * | 5/2008 | Wybenga et al. | 370/396 |

(Continued)

OTHER PUBLICATIONS

RFC 2740 "OSPF for IPv6"; Coltun, R., Ferguson, D., Moy, J.; Dec. 1999, 75 pages.*

*Primary Examiner*—Aung S Moe
*Assistant Examiner*—Benjamin Elliott
(74) *Attorney, Agent, or Firm*—Fay Kaplun & Marcin, LLP

(57) ABSTRACT

Described is a system and method for determining routing information for a network link, the network link including a plurality of subnets, each subnet having the same routing information as the network link, storing the routing information as an entry in a routing table, determining subnet information for each of the plurality of subnets and storing the subnet information for each of the plurality of subnets in the entry. Methods of comparing and searching the subnet information are also described.

6 Claims, 6 Drawing Sheets

U.S. PATENT DOCUMENTS

| | | |
|---|---|---|
| 7,411,964 B2 * | 8/2008 | Suemura .................... 370/400 |
| 7,433,355 B2 * | 10/2008 | Wilson et al. ................ 370/392 |
| 7,453,883 B1 * | 11/2008 | Lynch et al. ........... 370/395.32 |
| 7,483,430 B1 * | 1/2009 | Yuan et al. ............... 370/395.2 |
| 2002/0062388 A1 * | 5/2002 | Ogier et al. ................. 709/238 |
| 2002/0080798 A1 * | 6/2002 | Hariguchi et al. ...... 370/395.31 |
| 2002/0129086 A1 * | 9/2002 | Garcia-Luna-Aceves et al. ............... 709/200 |
| 2003/0016679 A1 * | 1/2003 | Adams et al. ............... 370/401 |
| 2003/0084187 A1 * | 5/2003 | Choe .......................... 709/238 |
| 2003/0137974 A1 * | 7/2003 | Kwan et al. ................. 370/352 |
| 2004/0032873 A1 * | 2/2004 | Basso et al. .................. 370/401 |
| 2004/0054807 A1 * | 3/2004 | Harvey et al. ............... 709/243 |
| 2004/0139274 A1 * | 7/2004 | Hui ............................. 711/108 |
| 2005/0078610 A1 * | 4/2005 | Previdi et al. ............... 370/254 |
| 2005/0141517 A1 * | 6/2005 | Choi et al. ............. 370/395.31 |
| 2006/0010249 A1 * | 1/2006 | Sabesan et al. ............. 709/238 |
| 2006/0045024 A1 * | 3/2006 | Previdi et al. ............... 370/254 |
| 2007/0008949 A1 * | 1/2007 | Balandin .................... 370/351 |
| 2007/0025328 A1 * | 2/2007 | Cohen et al. ................ 370/351 |
| 2007/0030855 A1 * | 2/2007 | Ribiere et al. ............... 370/401 |
| 2007/0189284 A1 * | 8/2007 | Kecskemeti ................. 370/389 |

* cited by examiner

SYSTEM AND METHOD FOR ROUTING TABLE COMPUTATION AND ANALYSIS

BACKGROUND INFORMATION

In a conventional networking system, the Open Shortest Path First (OSPF) routing algorithm is often used to calculate the shortest path between connected elements (e.g., a network, a router, etc.). OSPF is a link state routing protocol that stores information about every known link as a link state advertisement (LSA) within a link state database (LSDB). Using the well-known Dijkstra's algorithm to calculate the shortest path first (SPF), a routing table is computed that contains the shortest routes to every destination. This routing table is then used by the internet protocol (IP) to forward data between elements. Whenever new link information is received, OSPF runs SPF and updates routing table information.

A third version of OSPF, OSPFv3, is compatible with version 6 of the Internet Protocol (IPv6). A set of documents known as the Request For Comments (RFC) specifies Internet standards under which all versions of OSPF, including OSPFv3, need to comply. Specifically, RFC 2740 specifies that OSPF for IPv6 include multiple subnets per actual link in a network. Routing table computation is supposed to create a route entry for each IPv6 address (e.g., a subnet) assigned to a link. Each link includes its own cost, while each subnet prefix on the link adds an additional cost to that of the link. Thus, SPF calculation requires the calculation of each additional cost in addition to the cost of the link itself. This requires looking up each routing table entry corresponding to the subnets of the link, which is both computationally expensive and inefficient. Thus, there is a need for a system and method which reduces the time required for SPF calculation in addition to reducing the amount of memory required to support the SPF calculation.

SUMMARY OF THE INVENTION

A method for determining routing information for a network link, the network link including a plurality of subnets, each subnet having the same routing information as the network link, storing the routing information as an entry in a routing table, determining subnet information for each of the plurality of subnets and storing the subnet information for each of the plurality of subnets in the entry.

A comparison method for storing a first routing table entry including a route descriptor and a first plurality of sorted prefix blocks, each prefix block corresponding to a subnet of a first network link and including subnet information for the corresponding subnet, storing a second routing table entry including a second route descriptor and a second plurality of sorted prefix blocks, each prefix block corresponding to a subnet of a second network link and including subnet information for the corresponding subnet and determining if the first routing table entry is different from the second routing table entry by comparing the route descriptor of the first routing table to the route descriptor of the second routing table.

A network router node having a processor and a memory storing a routing table having at least one entry for each link and each node known by the network router node, the memory storing information about each link and each node in the form of a link state advertisement (LSA), each LSA including routing information for the corresponding link and node, the memory further storing a plurality of prefix blocks, each prefix block corresponding to a subnet of the network link, each prefix block including subnet information for the corresponding subnet.

A searching method for storing a plurality of routing table entries, each routing table entry including a route descriptor and a plurality of sorted prefix blocks, each prefix block corresponding to a subnet of a first network link and including subnet information for the corresponding subnet, comparing a search address to one entry of a prefix block of one of the routing table entries and skipping to a next one of the routing table entries when the search address is smaller than the one entry of the prefix block in the one of the routing table entries.

DETAILED DESCRIPTION

Figure 1:
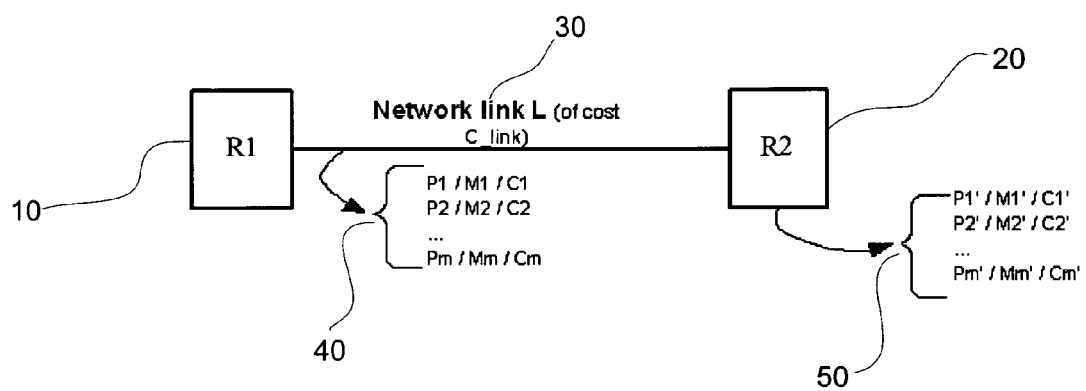
FIG. 1 shows an exemplary embodiment of a network segment according to the present invention.

The present invention may be further understood with reference to the following description of exemplary embodiments and the related appended drawings, wherein like elements are provided with the same reference numerals. In one exemplary aspect, the present invention is related to systems and methods used to compute and store routing tables. More specifically, the present invention is related to systems and methods for routing table computation and storage utilizing the OSPFv3 routing protocol. In another exemplary aspect, the present invention is related to systems and methods for analyzing routing tables.

Under OSPFv3, links between network elements (e.g., a router, a network, etc.) contain multiple subnets, and each subnet of a link is given its own entry within a routing table. FIG. 1 shows an exemplary network segment according to the present invention. A router R1 10 is connected to a second router R2 20 by means of a network link 30. The link 30 includes a cost, C_link which is common to a calculation of cost between the routers R1 10 and R2 20. The link 30 may include a list of subnets 40 with prefixes ranging from P1-Pm. The prefixes P1-Pm may include respective network masks M1-Mm, and respective costs C1-Cm. Each prefix cost C1-Cm adds an additional cost to the common cost C_link. In addition, the router R2 may contain its own set of subnets 50, with prefixes P1'-Pm', masks M1'-Mm', and costs C1'-Cm'. Thus, the prefixes of the link 30, along with the prefixes of the router R2 20, and the prefixes of the router R1 10 (not shown) may each contribute a cost to the common cost C_link when a shortest path first (SPF) computation is performed.

According to an exemplary embodiment of a system according to the present invention, storage of each subnet as an individual routing table entry is eliminated by aggregating subnets associated with a given link. Thus, the individual entries are replaced by a single aggregated entry. The replacement of the individual entries reduces an overall memory required for routing table storage. In addition, SPF computation time is also reduced as a result of a decrease in the time required to create and compare routing table entries. Details of the routing table entry computation and comparison will be described below.

Figure 2:
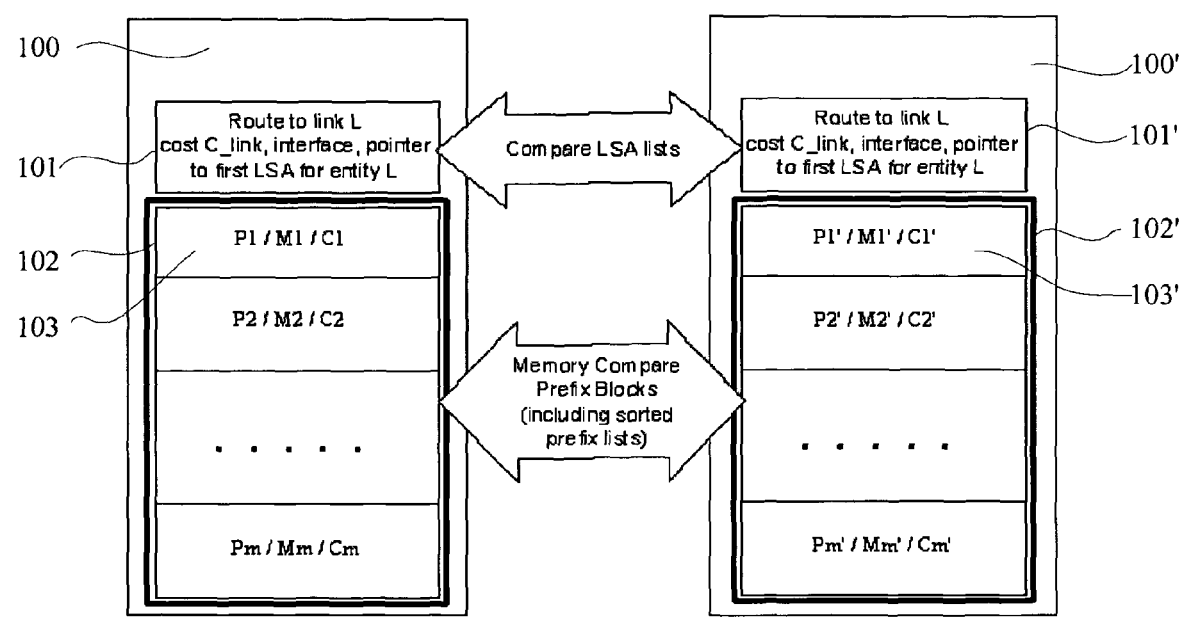
FIG. 2 shows an exemplary embodiment of routing table entries according to the present invention.

FIG. 2 shows a diagram of two routing table entries according to an exemplary embodiment of the present invention. A routing table entry 100 for a network element (e.g., a router, a network, etc.) includes a route descriptor 101. The route descriptor 101 includes this router's interface towards that route, the cost C of the path from this router to the link where the route resides, and a pointer to the first LSA describing the link. The entry 100 may include a prefix list 102, which is comprised of all the prefixes for the network element in the form of prefix blocks 103. Each prefix block 103 may include the prefix, mask, and cost of a respective subnet. The blocks 103 according to the present invention must be sorted in order (e.g., lexicographical order) from a first prefix P1, to a last prefix Pm. A second routing table entry 100' is substantially similar to the entry 100, and may include route descriptor 101', a prefix list 102', and prefix blocks 103'. The entry 100' may represent a routing table entry which is associated with the same network element as the entry 100. For example, the entry 100' may represent the routing table entry for the same network element after a network change has occurred, such as a change in a network status of another network element, an addition or removal of a subnet, a creation of a new link between existing network elements (one of which may be the same network element), an addition or removal of a network element, etc.

Figure 3:
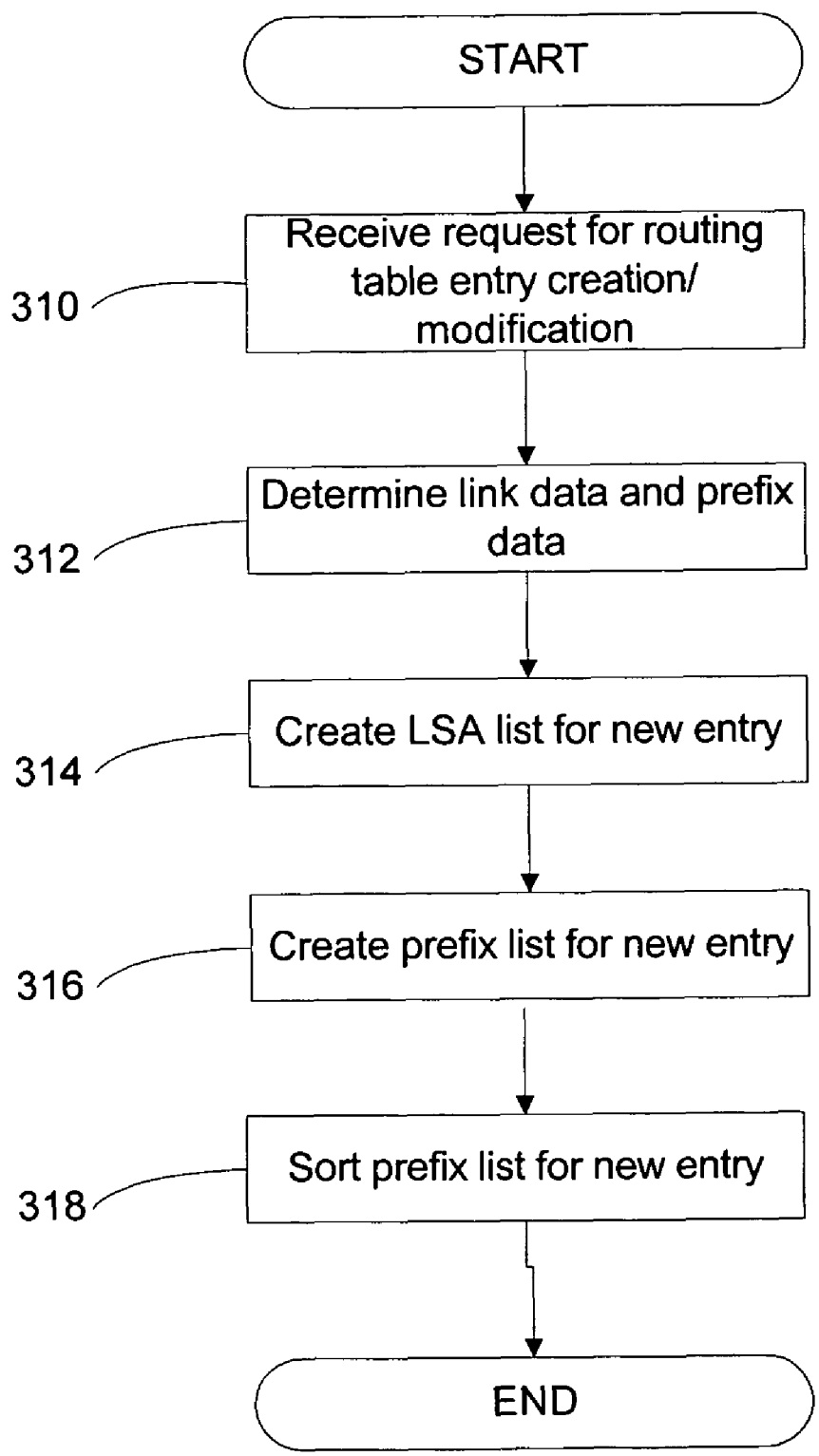
FIG. 3 shows an exemplary embodiment of a method for computing a routing table entry according to the present invention.

FIG. 3 shows an exemplary embodiment of a method 300 for computing a routing table entry according to the present invention that will be described in conjunction with FIG. 2. Beginning with step 310, a request for routing table entry creation/modification is received. The request may be generated as a result of the network change, which may necessitate a modification of one or more existing routing table entries. Alternatively, the network change may necessitate a creation of a new routing table entry.

In step 312, link element data and prefix data are determined. This information is extracted from the router LSA or network LSA for that element and also from the intra-area-prefix_LSA for that element. The link data may include any relevant link information, such as the cost C_link. The prefix data may include relevant prefix information, such as the prefix itself, the mask, and the cost of the prefix. In step 314, the route descriptor 101 is created using the SPF computed data and data from the LSA, while in step 316, the prefix list 102 is created by using the prefix data and aggregating the prefix data of all prefixes associated with the entry 100. For example, the route descriptor 101 may be created in step 314 by allocating enough memory to store the route descriptor 101 information (e.g., the link data), and the prefix list 102 may be created in step 316 by allocating memory for the array of prefix blocks 103 information (e.g., the prefix data), which includes the information for the prefixes P1-Pm. According to an exemplary embodiment of the present invention, the prefix blocks 103 are sorted in lexicographical order, with consecutive prefix blocks 103 occupying adjacent memory locations of a single contiguous memory. In this manner, the prefix blocks 103 may be easily located and retrieved when the SPF computation is performed. In step 318, the prefix list is sorted according to lexicographic order.

Figure 4:
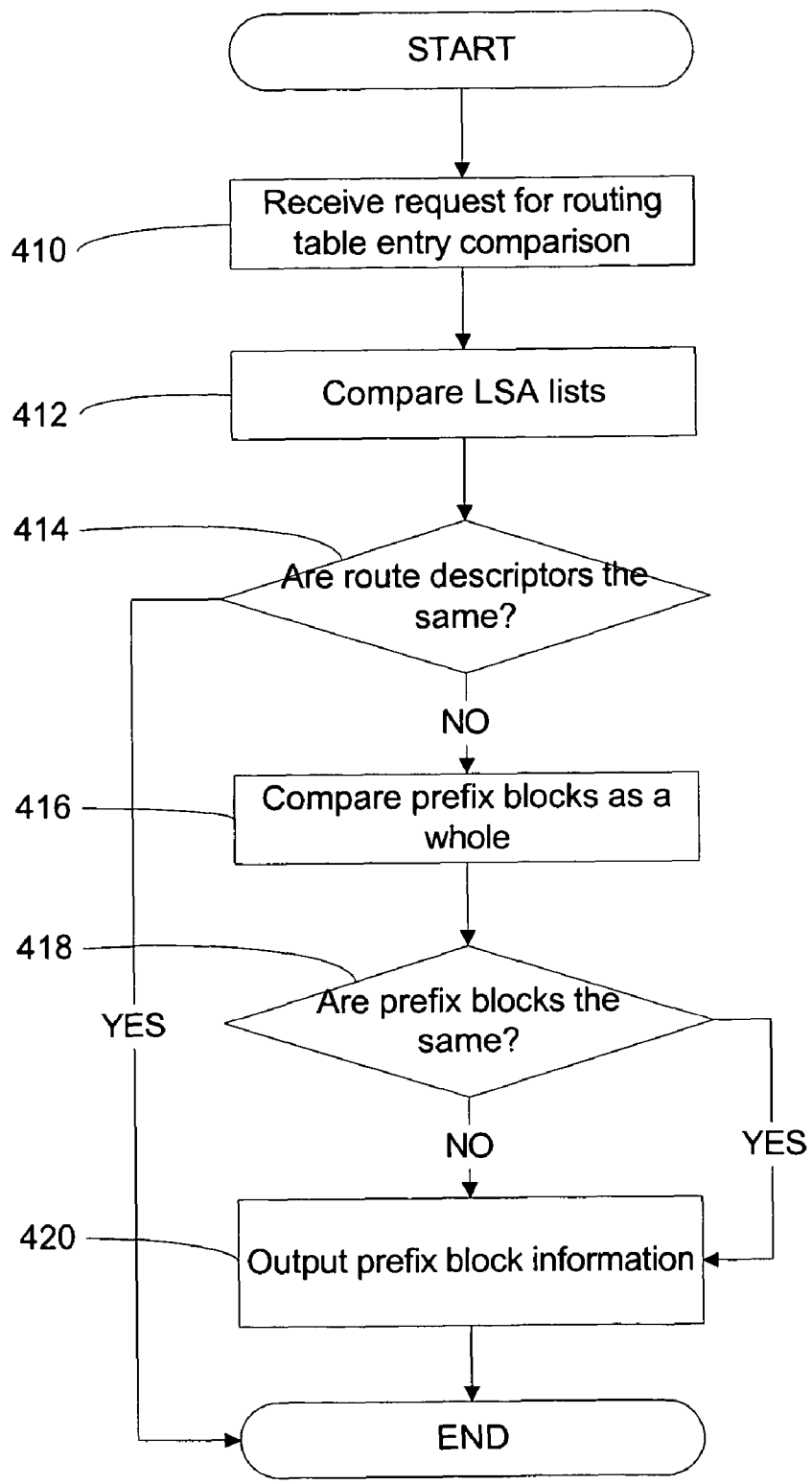
FIG. 4 shows an exemplary embodiment of a method for fast comparison of routing table entries according to the present invention.

FIG. 4 shows an exemplary embodiment of a method 400 for fast comparison of routing table entries according to the present invention. This exemplary method is also described with reference to FIG. 2. The routing table analysis may be performed in response to the SPF computation, or when a comparison between a newer copy of a routing table entry (e.g., entry 100') and an older copy of the routing table entry (e.g., entry 100) is desired. The method 400 begins with step 410, where a request for routing table entry comparison is made. In step 412, the router descriptors 101, 101' are compared to each other. That is, the interface from this router towards the route, the cost C_link and other LSA list information are compared. For speed, only the LSA addresses are compared, in order to determine if any of the information has changed, the actual content of the LSAs is not compared. Assuming the interface and cost information are the same, but the LSA addresses are different, this may indicate that the prefix lists 102, 102' are also different. Accordingly, in step 414, a determination is made as to whether the route descriptors 101, 101' are the same based upon the comparison in step 412. If the route descriptors 101, 101' are the same, then the network change has not occurred and the comparison method 400 is complete with result of routing table entries being identical.

In step 416, the LSA lists of the route descriptors 101, 101' are not the same, thus indicating a difference between the prefix lists 102, 102'. Accordingly, a comparison is made on the prefix blocks 103, 103' as a whole. According to an exemplary embodiment of the present invention, this is accomplished by performing a memory comparison of each corresponding pair of prefix blocks 103,103' as a whole. Since the prefix blocks 103, 103' are stored in lexicographical order, comparing the prefix blocks 103, 103' as a whole is sufficient to determine if they contain the same prefixes. If the prefix blocks contain the same prefixes, the prefixes will also be in the exact same order. Therefore the memory area where prefix block 103 is stored and the memory area where prefix block 103' is stored have identical contents and can be compared using this memory comparison instead of field by field comparison. An optimization for even better performance is comparing the whole prefix arrays 102, 102' in one memory comparison, sufficient to determine if all of the prefixes are identical, since the prefixes are sorted.

In step 418, it is determined whether the prefix blocks 103, 103' are the same (e.g., lexicographically equal). If the prefix blocks 103, 103' are not the same (e.g., P1 is not lexicographically equal to P1'), then the comparison algorithm is completed with result of routing table entries being different with the corresponding output being generated in step 420. If the prefix blocks 103, 103' are the same the comparison algorithm is completed with result of routing table entries being identical and the corresponding output is generated in step 420.

From the above-described exemplary embodiments, it will be apparent to those skilled in the art that the present invention offers certain advantages over the conventional method of routing table computation. For example, the present invention requires less memory utilization as a result of the aggregation of the prefixes. This eliminates storage of redundant information inherent to the conventional method, which creates multiple routing table entries for storing the prefixes of each subnet. Furthermore, because the prefixes are sorted, routing table entry comparison efficiency is increased, and thus, overall SPF computation time is reduced.

Figure 5:
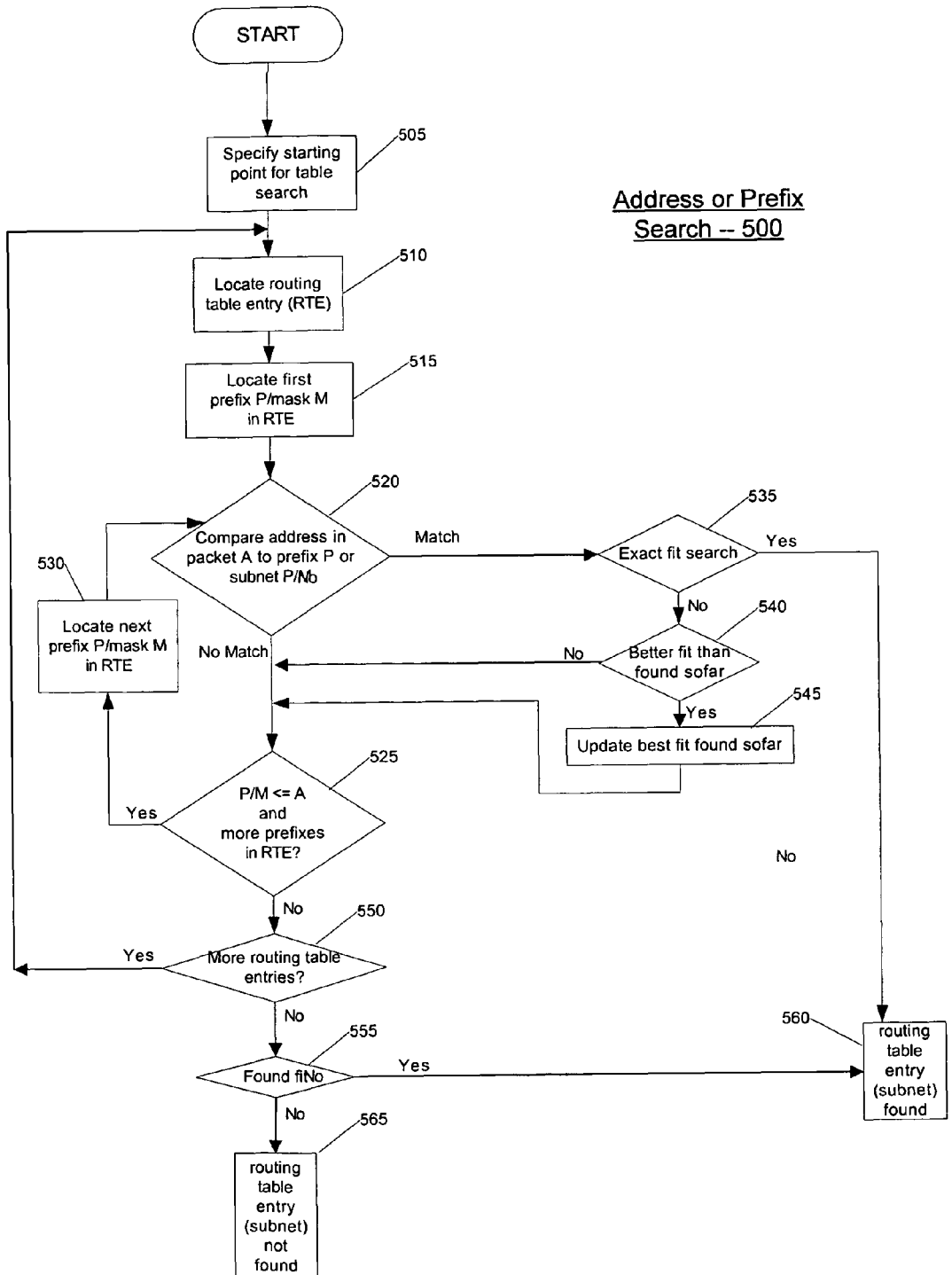
FIG. 5 shows an exemplary method for a fast and efficient search of an address or prefix in the routing table entry organized according to the present invention.

FIG. 5 shows an exemplary method 500 for a fast and efficient search of an address or prefix in the routing table entry organized according to the present invention. This can happen for example when information about new prefixes in different OSPFv3 routing areas or in different autonomous systems is received, for example when information about new routes is imported at the border of a routing autonomous system from other routing protocols. Thus, in step 505 a starting point for the search is specified. The correct routing table entry is located in step 510 and the first prefix and/or mask of the routing table entry is located in step 515.

The routing table is traversed and for every routing table entry the address is compared to the prefixes in the prefix block (step 520). The comparison continues until a match is found (step 535) or until a first lexicographically bigger address is found (steps 525 and 530). Since the prefixes are sorted in lexicographic order, once the prefix in the prefix block is bigger than the address or prefix searched for, there is no need to compare the address/prefix to the rest of the prefixes in the block of prefixes. In that case the algorithm immediately skips to the next routing table entry if a next one is available (step 550).

As shown in FIG. 5, the exemplary method 500 may include substeps 540 and 545 to iterate between the best fit match address/prefix that has been found even though these are not exact matches. Ultimately, as a result of steps 535 and/or 555, the method 500 will determine if a match is found (step 560) or if no match is found (step 565). It will be noted that this algorithm is faster than a regular search of an address in an OSPFv3 routing table, since the routing table is smaller (has fewer entries, one per link instead of one per prefix, where there are multiple prefixes per link), and also fewer prefixes are actually compared due to the storage of prefixes sorted in lexicographic order in their prefix blocks.

It should be noted that the above-described exemplary embodiments do not make the resulting OSPFv3 implementation non-RFC compliant. RFC 2740 neither specifies nor recommends a preferred method for building a routing table that supports multiple prefixes. Neither does RFC 2740 specify the storage structure of the routing table that supports multiple prefixes. Therefore, the above-described exemplary embodiments may be applied without violating RFC standards. This is true as long as the OSPFv3 implementation reports one route per prefix to its users (IP and other routing protocols).

Figure 6:
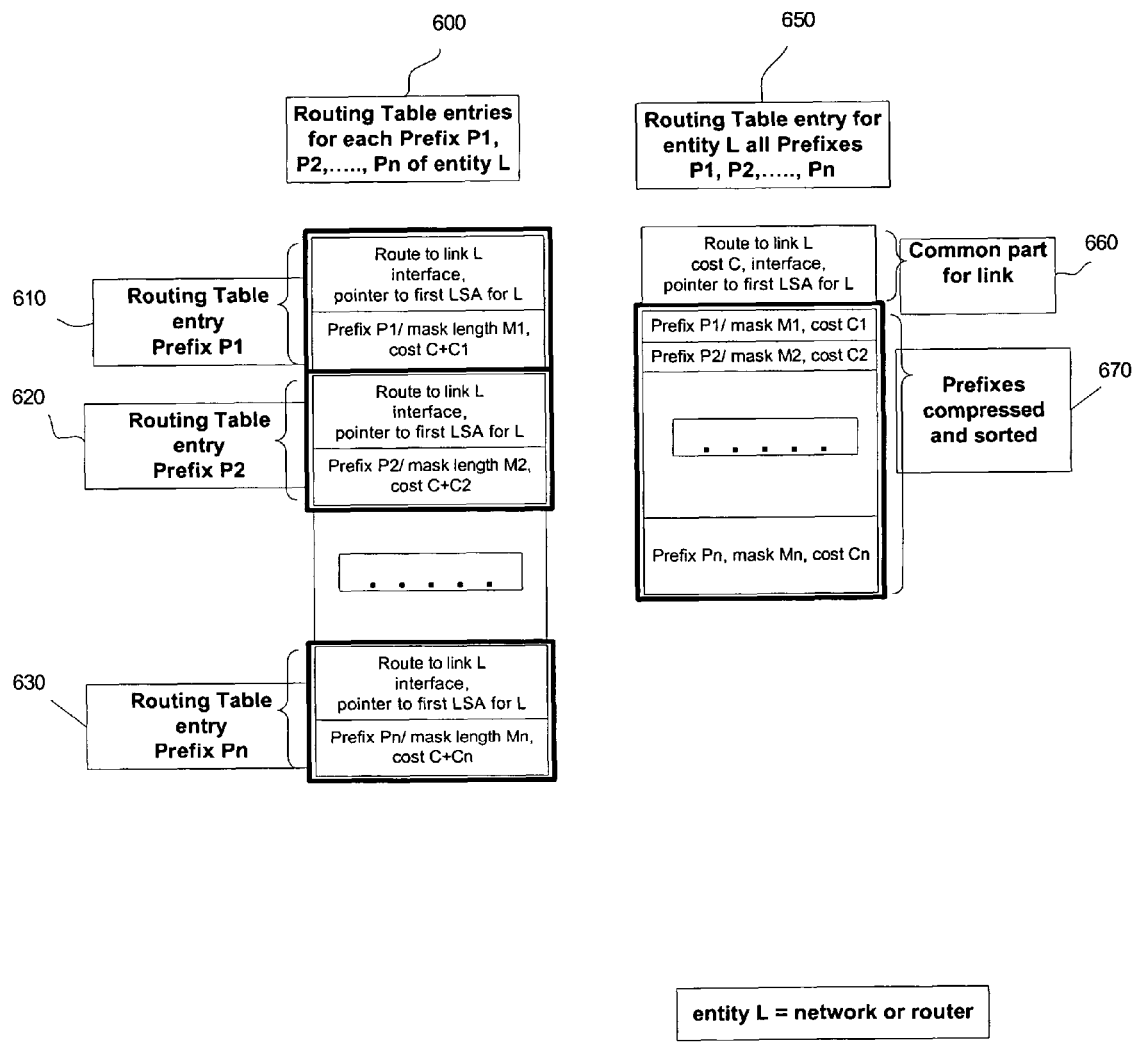
FIG. 6 shows a comparison of a standard routing table entry and an exemplary embodiment of a routing table entry according to the present invention.

FIG. 6 shows a comparison of a standard routing table entry 600 and an exemplary embodiment of a routing table entry 650 according to the present invention. The standard routing table entry 600 is for an entity L that may be, for example, a network, a router, etc. The routing table entry includes a plurality of prefixes P1 610, P2 620 and Pn 630. Each of these prefixes 610-630 include a complete listing of the route to the entity L and all the additional information required of the routing table entry, thereby duplicating information within the routing table entry.

In contrast, the routing table entry 650 for the same entity L according to the present invention, has a common route descriptor 660 including this entity's interface towards that route, the cost C of the path from this entity to the link where the route resides, and a pointer to the first LSA describing the link. The routing table entry 650 also includes a prefix list 670 that is comprised of all the prefixes for the entity L in the form of prefix blocks that are sorted and compressed. Each prefix block in the prefix list 670 includes the prefix, mask, and cost of a respective subnet and the blocks are sorted in lexicographical order from the first prefix P1 to a last prefix Pn. This comparison shows that the routing table entry 650 uses less memory than the routing table entry 600 because the duplication of data is eliminated. Furthermore, the above description provided exemplary manners of comparing routing table entries and searching routing table entries using the routing table entry 650 that are advantageous over comparable procedures performed for the standard routing table entry 600.

There are many modifications of the present invention which will be apparent to those skilled in the art without departing from the teaching of the present invention. The embodiments disclosed herein are for illustrative purposes only and are not intended to describe the bounds of the present invention which is to be limited only by the scope of the claims appended hereto.

What is claimed is:

1. A comparison device, comprising:
   a processor; and
   a memory including a set of instructions performed by the processor, the set including:
   storing a first routing table entry including a route descriptor and a first plurality of sorted prefix blocks, each prefix block corresponding to a subnet of a first network link and including first subnet information for the corresponding subnet, the first route descriptor describing each of the sorted prefix blocks within the first plurality of sorted prefix blocks as having the same routing information as the first network link, the first subnet information set for each subnet including a prefix, a mask and a cost;
   storing a second routing table entry including a second route descriptor and a second plurality of sorted prefix blocks, each prefix block corresponding to a subnet of a second network link and including second subnet information for the corresponding subnet the second route descriptor describing each of the sorted prefix blocks within the second plurality of sorted prefix blocks as having the same routing information as the second network link, the second subnet information set for each subnet including a prefix, a mask and a cost; and
   determining if the first routing table entry is different from the second routing table entry by comparing the route descriptor of the first routing table entry to the route descriptor of the second routing table entry.

2. The device of claim 1, further comprising: comparing, when it is determined that the route descriptor of the first routing table entry is different from the route descriptor of the second routing table entry, the sorted prefix block of the first routing table entry to the sorted prefix block of the second routing table entry.

3. The device of claim 1, wherein each of the route descriptors includes a link state advertisement and the comparison of the route descriptors is of the link state advertisements.

4. The device of claim 1, wherein each of the route descriptors includes one of an interface of a corresponding router towards the route, a network link and a cost of the route from the corresponding router to the network link.

5. The device of claim 1, wherein the prefix blocks are sorted in lexicographic order.

6. The device of claim 1, wherein the network links are one of a network, a router, a switch and a gateway.

* * * * *